United States Patent Office 3,168,589
Patented Feb. 2, 1965

3,168,589
ORGANOBORON HALIDE POLYMERIZATION CATALYSTS
Donald R. Witt, Bartlesville, Okla., assignor to Phillips Petroleum Company, a corporation of Delaware
No Drawing. Filed May 16, 1961, Ser. No. 110,344
10 Claims. (Cl. 260—683.15)

This invention relates broadly to the polymerization of propylene and higher olefins. In accordance with one aspect, this invention relates to a novel polymerization catalyst. In accordance with another aspect, this invention relates to a process for the polymerization of propylene and higher olefins employing a novel polymerization catalyst for the production of liquid polymers.

The polymerization of olefins, especially propylene, by means of various catalyst systems is well known in the art. However, many of the known processes have been found to have numerous drawbacks in their operation, either in the properties of the product obtained or in the efficiency of operation. Thus, it can be safely stated that there is still considerable room for improvement in the polymerization field for the provision of new catalyst systems.

According to the invention, a novel polymerization catalyst and a process employing same are provided for the production of liquid polymers of propylene and higher olefins at high production rates.

Accordingly, an object of this invention is to provide a novel polymerization catalyst.

Another object of this invention is to provide a polymerization process employing said novel catalyst.

A further object of this invention is to provide a process for the homopolymerization and copolymerization of propylene and higher olefins to form valuable liquid polymers.

Other objects and advantages of the invention will become apparent from a consideration of this disclosure.

In accordance with the invention, liquid polymers of propylene and higher olefins are obtained by polymerizing at least one of these monomers in the presence of a catalyst comprising an organoboron halide compound associated with an acidic support material such as silica, alumina, titania, zirconia, boria, thoria, and the like, or combinations of these.

Liquid polymers of propylene and higher olefins which are useful for lubricants or lubricant-improving additives, or detergent manufacture, can be prepared according to the invention under moderate and convenient conditions in the presence of a catalyst comprising an organoboron halide compound associated with an inorganic oxide support material. I have found that neither the boron-containing compound nor the inorganic oxide material individually show very much, if any, activity for such polymerization, but the combination of the two ingredients results in a surprisingly active propylene polymerization catalyst.

The novel catalysts of this invention are formed by associating an acidic support material or an inorganic oxide solid material such as silica, alumina, titania, zirconia, boria, thoria, and the like, or combinations of these materials, with an organoboron halide compound. The organoboron halide compound can be represented by the structural formula $R_aBX_b$ wherein R is a monovalent hydrocarbon radical, B is the element boron, X is a halogen such as chlorine, bromine, iodine and fluorine, preferably chlorine or fluorine, and $a$ and $b$ are integers of at least 1 whose sum totals 3.

The hydrocarbon radicals referred to in the above formula are saturated cyclic, saturated acyclic, or aromatic radicals which contain from 1 to 14, inclusive, carbon atoms and can be alkyl, cycloalkyl, aryl, aralkyl, alkylaryl, and the like radicals, with the R groups being alike or different. Frequently, all of the hydrocarbon radicals will be alkyl radicals and generally will not contain more than six carbon atoms per radical.

Representative examples of suitable organoboron halide compounds that can be employed according to the invention include: methylboron difluoride, dimethylboron monobromide, ethylboron diiodide, i-propylboron difluoride, n-butylboron difluoride, di-n-butylboron monofluoride, n-butylboron dichloride, di-n-butylboron monochloride, i-butylboron difluoride, di-i-butylboron monofluoride, di-i-butylboron monoiodide, phenylboron difluoride, di(3-cyclopentylphenyl)boron monobromide, 3-(2-ethylcyclopentyl)propylboron difluoride, diphenylboron monofluoride, phenylboron dichloride, diphenylboron monochloride, benzylboron dibromide, ditolyboron fluoride, 2-cyclopentylethylboron difluoride, 3-benzylcyclohexylboron dichloride, cyclohexylboron dibromide, methylcyclohexylboron dichloride, 2,4-dimethylphenylboron dichloride, n-pentylboron difluoride, diisooctylboron bromide, n-dodecylboron difluoride, di-n-tetradecylboron monochloride, n-tetradecylboron difluoride, and the like.

The organoboron halide compounds of the invention can be prepared by any method desired and known to the art. One convenient method of preparing these organoboron halides is by reacting a boron halide compound with an organoboron compound to form the desired organoboron halide. Another suitable method for preparing these materials is by reacting an organozinc compound with a boron halide to form the desired organoboron halide compound.

The solid inorganic oxide materials or acidic support materials preferably employed according to the invention are the high surface area silicas, aluminas, titanias, zirconias, borias, thorias, silica-aluminas, and the like, which are all well known and can be readily synthesized or obtained commercially. These solid inorganic oxides are generally finer than U.S. Mesh No. 50 and ordinarily exhibit a surface area from about 100 to about 1,000 m.$^2$/g. In practicing this invention, the solid inorganic oxide is first activated by heating to a temperature of at least 500° F. but not in excess of about 1900° F. Preferably, the inorganic oxide is activated by heating at a temperature in the range 500 to 1200° F. from a few minutes up to 20 to 30 hours or more. Activation of the inorganic oxide can be carried out in any desired manner; however, I prefer to heat the support material with air at elevated temperature or in an atmosphere of any suitable gas such as hydrogen, helium, nitrogen, etc.

The inorganic oxide employed can be prepared by any method desired and known to the art. For example, silica gel can be readily obtained by precipitation from water glass solutions by addition of an acid such as phosphoric acid. Alumina, on the other hand, can be precipitated from solutions of an aluminum salt.

The catalyst composite of the invention can be prepared by any method desired and known to the art. According to one procedure, the catalyst can be prepared by impregnation of particulate silica, alumina, titania, thoria, zirconia, boria, silica-alumina, for example, with a solution of an organoboron halide followed by drying of the composite at elevated temperature under the protection of an inert atmosphere. The catalyst support can be impregnated by dispersing the boron halide compound in an inert hydrocarbon diluent such as cyclohexane, benzene, etc., at a temperature in the range of 30 to 150° F. for a period of time ranging from 0.25 to about 20 hours in an inert atmosphere followed by removal of the inert hydrocarbon by means of reduced pressure and a temperature in the range of 50 to 150° F. The final catalyst composites so prepared generally contain from 0.1 to 30 weight percent of the organoboron halide compound.

The catalysts of this invention are effective for the homopolymerization of 1-olefins having from 3 to 8 carbons and the copolymerization of these olefins with each other. The invention is particularly applicable for the production of liquid polymers of propylene, which includes homopolymers of propylene as well as copolymers of propylene and at least one other olefin. The homopolymerization or copolymerization in accordance with this invention can be conducted in accordance with the techniques which are well known to those skilled in this art. The olefin monomeric feed will consist of propylene or a higher molecular weight olefin as the sole monomer when a homopolymer is desired. When a copolymer is desired, the monomeric feed generally contains a major proportion of a lower molecular weight olefin, e.g. propylene, and a minor proportion of a higher olefin having up to and including 8 carbon atoms per molecule. Representative examples of suitable 1-olefins that can be polymerized according to the invention include propylene, 1-butene, isobutylene, 1-pentene, 1-hexane, 1-heptene, 1-octene, 4-methyl-1-pentene, and the like. In many cases, the higher olefin is present in amounts less than about 25 weight percent based on total olefin feed. If desired, diolefins such as butadiene and isoprene can also be copolymerized with propylene according to the invention.

The polymerization according to this invention is best carried out in liquid phase, preferably in the presence of an inert diluent and particularly hydrocarbon diluents, such as paraffins and cycloparaffins having from 3 to 12 carbon atoms per molecule. Suitable diluents include propane, isobutane, normal butane, isopentane, the hexanes, isooctane, cyclohexane, methylcyclohexane, and the like. Aromatic hydrocarbons having from 6 to 12 carbon atoms per molecule can be used, such as benzene, toluene, the xylenes, ethylbenzene, and the like. The diluent when used is generally present in sufficient amount so that the olefin concentration in the total feed is of the order of 0.5 to 10 weight percent, although these limits are not absolute.

The process of the invention can be carried out batchwise or it can be continuous. Frequently, the catalyst is dispersed in the diluent, in which case it is often convenient to first disperse the catalyst in the diluent and pass the resulting suspension to the reaction zone where the monomer can be separately introduced or it can be predissolved in a separate portion of the diluent. The polymerization can be carried out at a temperature in the range of 150 to 475° F. The pressure employed in carrying out the polymerization is preferably high enough to maintain the diluent, when a diluent is used, in the liquid phase and to assure that olefins not liquefied under these conditions are dissolved in the liquid phase in sufficient amount. Pressures of the order of about 0 p.s.i.g. to about 2000 p.s.i.g. are generally adequate for this purpose. The residence time can range from a few minutes to 10 or more hours and it is generally in the range 0.5 to 5 hours. While liquid phase processes are preferred, vapor phase polymerization processes are contemplated.

The catalyst-monomer(s) contacting technique can be any of those well known in the catalyst art. Thus, the reaction can be conducted by contacting the monomeric feed with a fixed bed of catalyst, with a gravitating bed of catalyst, with a catalyst suspended in finely divided particulate form in the diluent which can be maintained in suspension by agitation, agitation formed by the use of a fluidized bed technique, and the like. When the polymerization is carried out in a stirred reactor, the catalyst concentration will generally range from about 1 to 40 weight percent of the reaction mixture. In a fixed catalyst bed operation, the feed vapor space velocity will generally range from about 10 to 10,000 v./v./hr.

Various materials, such as water, oxygen and the like, in some instances have a tendency to inactivate the catalyst of the invention. Therefore, it is usually desirable to free the propylene feed or diluent from these materials as well as other materials that may tend to inactivate the catalyst before contacting the monomer and diluent with the catalyst. Any of the known means for removing such contaminants can be employed. Also, it is desirable to remove air and moisture from the reaction vessel before the reaction is carried out.

At the completion of the polymerization reaction, the polymer can be recovered by a suitable method known in the art. The liquid polymers, for example, can be recovered by such methods as solvent evaporation, extraction, distillation and the like.

The polymers produced in accordance with this invention have utility and application where liquid polymers of 1-olefins are normally used. They can be used as lubricants, additives to lubricants, plasticizers for solid materials, such as rubber and synthetic resins, in the manufacture of detergents, and the like.

A more comprehensive understanding of the invention can be obtained by referring to the following illustrative examples which are not intended, however, to be unduly limitative of the invention.

*Example I*

The following prcoedure was employed for the preparation of n-butylboron difluoride. A 36.7 gram quantity of tri-n-butylboron was placed under a nitrogen blanket in a vessel equipped with an agitator and upon which was mounted a simple distillation assembly. Boron trifluoride was passed into the flask and the flask was gradually warmed with a heating mantle. At the end of two hours the pot temperature was 360° F. and a liquid had begun to be distilled at a head temperature of about 130° F. The distillation was continued until the pot temperature rose to about 392° F. The contents of the receiver were then transferred to another distillation assembly containing a fractionating column. The liquid was slowly fractionally distilled and the portion boiling at 94 to 96° F. at atmospheric pressure, which was n-butylboron difluoride, was collected and stored under a nitrogen atmosphere.

A polymerization catalyst was prepared by adding 35 cc. of dry cyclohexane, 4 cc. of the n-butylboron difluoride prepared above, and 17.5 grams of alumina (preactivated for 5 hours at 1100 F. in air) to a dry Pyrex flask. This mixture was agitated for 30 minutes and allowed to remain undisturbed for about 16 hours. The flask was then subjected to reduced pressure and the solvent and other volatiles were removed at room temperature.

An 8.23 gram quantity of the above-prepared catalyst was transferred to a 1.6 liter stainless steel reactor equipped with an agitator together with 241 grams of n-pentane. The reactor was closed and 500 grams propylene was added in 2 hours while maintaining a temperature of 240° F. and a pressure of 450 p.s.i.g. At the end of this period the reactor was vented and opened. The liquid contents were transferred to another vessel and the diluent and other volatiles removed by distillation. The yield was 297.4 grams of polypropylene oil.

*Example II*

Another catalyst was prepared by adding 30 cc. of dry cyclohexane, 4.2 cc. of n-butylboron difluoride, and 7.14 grams of 87:13 silica-alumina (preactivated for 5 hours at 1100° F. in air) to a dry Pyrex flask. This mixture was agitated and after 15 minutes the cyclohexane and other volatiles were removed at reduced pressure and at room temperature. The solid catalyst which resulted was stored under nitrogen until used.

A 6.25 gram quantity of the above-prepared catalyst was transferred to a 1.6 liter stainless steel reactor equipped with an agitator together with 241 grams of n-pentane diluent. The reactor was closed and 400 grams propylene was added in 2 hours while maintaining a 240° F. temperature and a 450 p.s.i.g. pressure.

Pentane and unreacted propylene were evaporated from the reactor contents leaving 173.8 grams liquid propylene polymers. The liquid polymer was fractionally distilled with the following results:

| B.P. range, °F. (at 1 atmos.): | Wt. percent |
|---|---|
| 118–267 | 11.5 |
| 267–275 | 28.4 |
| 275–370 | 34.3 |
| >370 | 25.8 |

*Example III*

A 7.13 gram quantity of 100 to 170 mesh alumina (203 m.$^2$/g. surface area) was charged to a 1.6 liter stainless steel reactor equipped with an agitator together with 241 grams of n-pentane diluent. The vessel was closed and 175 grams of propylene was added in 2 hours while maintaining 240° F. and 450 p.s.i.g. The yield of liquid propylene polymers was only 6.5 grams.

A 5.4 cc. quantity of n-butylboron difluoride was charged into a 1.6 liter stainless steel reactor equipped with an agitator together with 241 grams of n-pentane. The reactor was sealed and 190 grams of propylene was added in 2 hours while maintaining 240° F. temperature and 450 p.s.i.g. No measurable amount of product was obtained.

Thus, it can be seen that the organoboron halide compound and support material individually exhibited very little polymerization activity, whereas a composite of these materials was quite active for propylene polymerization as demonstrated in Examples I and II.

As will be evident to those skilled in the art, many variations and modifications of this invention can be practiced in view of the foregoing disclosure. Such variations and modifications are clearly believed to come within the spirit and scope of the invention.

I claim:

1. A process for the production of liquid polymers of propylene and higher olefins which comprises contacting at least one of said olefins at a temperature in the range of 150 to 475° F. with a catalyst composite consisting essentially of an alkylboron difluoride supported on an activated inorganic metal oxide material selected from the group consisting of alumina and silica-alumina, and recovering the polymer produced.

2. A process according to claim 1 wherein said contacting is carried out in the presence of an inert hydrocarbon diluent.

3. A process according to claim 1 wherein said alkylboron difluoride is n-butylboron difluoride.

4. A process for the production of liquid polymers of propylene which comprises contacting propylene and mixtures of propylene and higher olefins at a temperature in the range of 150 to 475° F. with a catalyst mixture consisting essentially of from 0.1 to 30 weight percent of an alkylboron difluoride, and the remainder being an activated inorganic metal oxide support material selected from the group consisting of alumina and silica-alumina dispersed in an inert carbon diluent, and recovering said polymer.

5. A process for the production of liquid polymers of propylene which comprises contacting propylene at a temperature in the range 150 to 475° F. with n-butylboron difluoride supported on activated silica-alumina dispersed in n-pentane, and recovering said liquid polypropylene.

6. A process for the production of liquid polymers of propylene which comprises contacting propylene at a temperature in the range 150 to 475° F. with n-butylboron difluoride supported on activated alumina dispersed in n-pentane, and recovering said liquid polypropylene.

7. A catalyst consisting essentially of an alkylboron difluoride supported on an activated inorganic metal oxide selected from the group consisting of alumina and silica-alumina.

8. A catalyst according to claim 7 wherein the amount of said alkylboron difluoride ranges from 0.1 to 30 weight percent of the composite.

9. A composition according to claim 7 wherein said alkylboron difluoride is n-butylboron difluoride and said support is silica-alumina.

10. A catalyst according to claim 7 wherein said alkylboron difluoride is n-butylboron difluoride and said support is alumina.

References Cited in the file of this patent

UNITED STATES PATENTS

| 2,657,245 | Davidson | Oct. 27, 1953 |
| 2,840,551 | Field et al. | June 24, 1958 |
| 2,867,675 | Shapiro et al. | Jan. 6, 1959 |
| 2,882,289 | Appell | Apr. 14, 1959 |
| 2,985,633 | Welch | May 23, 1961 |